United States Patent [19]
Hubbard

[11] 3,823,985
[45] July 16, 1974

[54] TRANSDUCER DEVICE FOR ELECTRICALLY OPERATED BRAKES

[75] Inventor: Harold C. Hubbard, Lansing, Mich.
[73] Assignee: Motor Wheel Corporation, Lansing, Mich.
[22] Filed: Jan. 12, 1973
[21] Appl. No.: 322,946

[52] U.S. Cl.................. 303/7, 73/398 AR, 303/15, 338/101
[51] Int. Cl............................................. B60t 13/66
[58] Field of Search............ 303/7, 3, 2, 15, 13, 20, 303/16, 17; 188/3, 158, 161; 338/41, 36, 1, 101–113, 115; 73/398 AR, 419

[56] References Cited
UNITED STATES PATENTS

| | | | |
|---|---|---|---|
| 401,405 | 4/1889 | Benardos | 338/100 |
| 2,454,291 | 11/1948 | Penrose | 338/113 |
| 3,212,065 | 10/1965 | Leonard | 188/158 |
| 3,283,283 | 11/1966 | Denner et al. | 338/41 |
| 3,350,142 | 10/1967 | Schuman | 303/7 |
| 3,486,799 | 12/1969 | Greentree | 303/7 |

Primary Examiner—Duane A. Reger
Assistant Examiner—D. C. Butler
Attorney, Agent, or Firm—Barnes, Kisselle, Raisch & Choate

[57] ABSTRACT

An electro-mechanical pressure responsive control system and apparatus for controlling the current supplied to the actuating coils of electric brakes of a towed vehicle. The control includes a transducer having a flexible bellows with a powdered magnetic material received therein which, when compressed by foreshortening of the bellows due to operation of the brake system of a towing vehicle, decreases in electrical resistance and thereby supplies greater current to the brakes of the towed vehicle, and vice versa. A magnetic field prevents the powdered material from becoming permanently compacted by repeated cycling of the bellows.

13 Claims, 3 Drawing Figures

TRANSDUCER DEVICE FOR ELECTRICALLY OPERATED BRAKES

This invention relates to a control system for electrically operated brakes of a towed vehicle and more particularly to an electro-mechanical rheostat or transducer for controlling the current supplied to the brakes of the towed vehicle in proportion to the force applied to the brakes of the towing vehicle.

It is customary today to provide certain types of towed vehicles, such as house trailers, travel trailers, campers and boat trailers, with electrically-actuated brakes of the type disclosed in U.S. Pat. No. 3,244,259 and to operate such brakes from the electrical system of the towing vehicle. Various electric brake control systems have been provided for manual operation by the driver of the towing vehicle, such as wiper and leaf switch type rheostat controls mounted on the steering column or dashboard of the towing vehicle or preferably electronic controllers such as disclosed in U.S. Pat. No. 3,503,652. Also, "slave" electric brake control systems have been provided, alone or in conjunction with such manual controls, which are controlled in relation to or responsive to actuation of the tractor or towing vehicle brake pedal, either directly by mechanical coupling to the foot pedal or indirectly in response to the fluid pressure developed upon application of the brakes of a hydraulic or pneumatic brake system of the towing or tractor vehicle. Various forms of transducer devices have been proposed in such control systems for sensing the mechanical force applied to the tractor brakes or fluid pressure developed in response thereto to cause the operating current in the electric system which is applied to the brake-operating magnets in the electric braking system to vary approximately in proportion to the force applied to and/or pressure developed in the hydraulic system. One such form of transducer is that disclosed in U.S. Pat. No. 2,454,291 wherein a carbon-pile compression-rheostat is proposed in which the flow of current is controlled by varying the pressure on a pile or stack of resistor discs or elements which may be made of carbon or similar material. Another form of pressure variable resistor is that shown in U.S. Pat. No. 3,574,414. However, such force or pressure sensing transducers either lack reliability, are too costly, or are incapable of operating as a series element in the load circuit and therefore require electronic amplifying circuitry to isolate the sensor from the load circuit.

Accordingly, it is an object of the present invention to provide a trailer braking control system which is safe, reliable and compatable with existing types of trailer electric brakes, which is capable of controlling trailer braking forces proportional to tractor braking force, which can be either mechanically actuated by the foot pedal of the towing vehicle or by the fluid pressure developed in the fluid braking system of the towing vehicle, and which incorporates an improved pressure responsive variable resistance device which requires a minimum displacement and thus minimizes the volume of fluid withdrawn from the hydraulic system to control the electric brakes, which is rugged and economical in construction, which offers the designer a wide choice of parameters to match particular applications and which has a long useful life and is maintenance and trouble free.

These and other objects, features and advantages of this invention will become apparent from the following description, appended claims and accompanying drawings in which:

Figure 1:
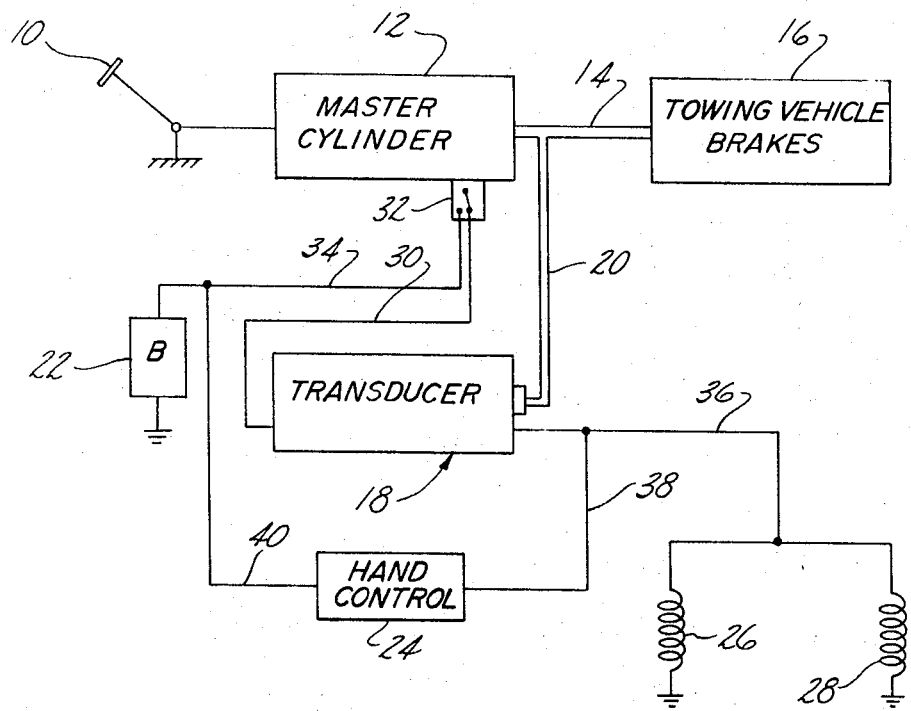
FIG. 1 is a schematic view of the hydraulic and electric brake circuits of a towed and a towing vehicle employing an exemplary but preferred form of a variable rheostat or transducer embodying this invention therein.

Referring to the drawings in more detail, FIG. 1 schematically illustrates a hydraulic brake system of a towing vehicle having a brake pedal 10 mechanically connected by the usual linkage to a master cylinder 12 which is coupled through brake fluid lines 14 to wheel brake cylinders 16. A variable rheostat device 18, herein termed a transducer, and embodying this invention is connected with master cylinder 12 by a branch fluid line 20 communicating with the pressure fluid in line 14. A battery 22 in the towing vehicle, which may be the usual 12-volt ignition and illumination storage battery of the vehicle, supplies direct current to transducer 18 and to a conventional hand control 24 to energize and control the electromagnetic brake coils 26 and 28 of the conventional electric brake system of a towed vehicle such as a trailer. Transducer 18 has one terminal thereof connected by a lead 30 to one terminal of a normally open switch 32, such as a stoplight switch operated by master cylinder 12, which in turn has its other terminal connected by a lead 34 to the positive terminal of battery 22. The other terminal of transducer 18 is electrically connected with parallel brake coils 26 and 28 by lead 36 and parallel branch leads 38, the opposite ends of the coils being connected to chassis ground. Hand controller 24 is connected in shunt with transducer 18 between coils 26 and 28 and battery 22 via leads 38 and 40.

Figure 2:
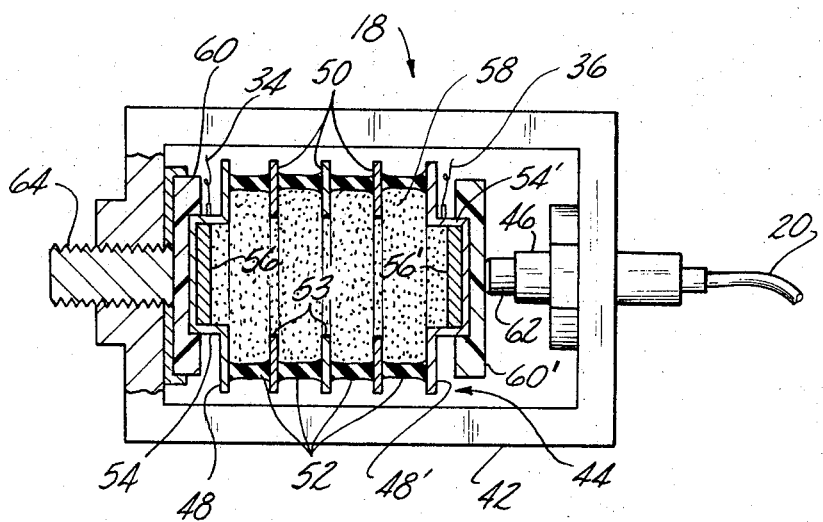
FIG. 2 is a vertical sectional view along the axis of the hydraulically actuated transducer of FIG. 1 shown by itself.

As shown in FIG. 2, transducer 18 has a generally rectangular metallic frame or housing 42 with a bellows assembly 44 received therein. Bellows assembly 44 is actuated by the plunger of a hydraulic cylinder 46 which extends through and is stationarily mounted in one end of frame 18 and which is connected with master cylinder 12 through hydraulic line 20. Bellows assembly 44 has two generally opposed circular hat-shaped end caps 48 and 48' with a plurality of axially spaced washers 50 interposed between the ends caps, the caps and washers being made of a heat conductive paramagnetic material such as aluminum. A ring 52 of a flexible resilient electrically nonconductive material, such as a silicone rubber adhesive such as that sold under the trademark SILASTIC by General Electric Company, is interposed between and bonded to the faces of each adjacent pair of washers 50 and end caps 48. Washers 50 preferably extend radially inwardly and outwardly beyond resilient rings 52 to provide heat transfer cooling fins for bellows assembly 44.

Each end cap 48, 48' has a cup 54, 54' with an axially polarized ceramic disc permanent magnet 56, 56' received therein. Preferably, magnets 56, 56' are oriented coaxially and so that the north pole of one disc magnet faces the south pole of the other disc magnet. Bellows assembly 44 is partially filled with a powdered magnetic material 58, such as powdered nickel, powdered iron or a mixture thereof. If desired, bellows assembly 44 can be evacuated and then injected with an inert gas such as nitrogen to prevent oxidation of the powdered magnetic material. Lead wires 34 and 36 are electrically connected one to each of the end caps 48, 48'. The bellows assembly is received in retaining caps 60, 60' made of an electrical insulating material such as nylon. One of the caps 60' bears on a movable plunger 62 of hydraulic cylinder 46 and the other cap 60 is fixedly received in a retainer 64. Retainer 64 is axially threaded in frame 18 to adjust the initial overall length of bellows assembly 44 and to urge it into engagement with plunger 62 of hydraulic cylinder 46.

Figure 3:
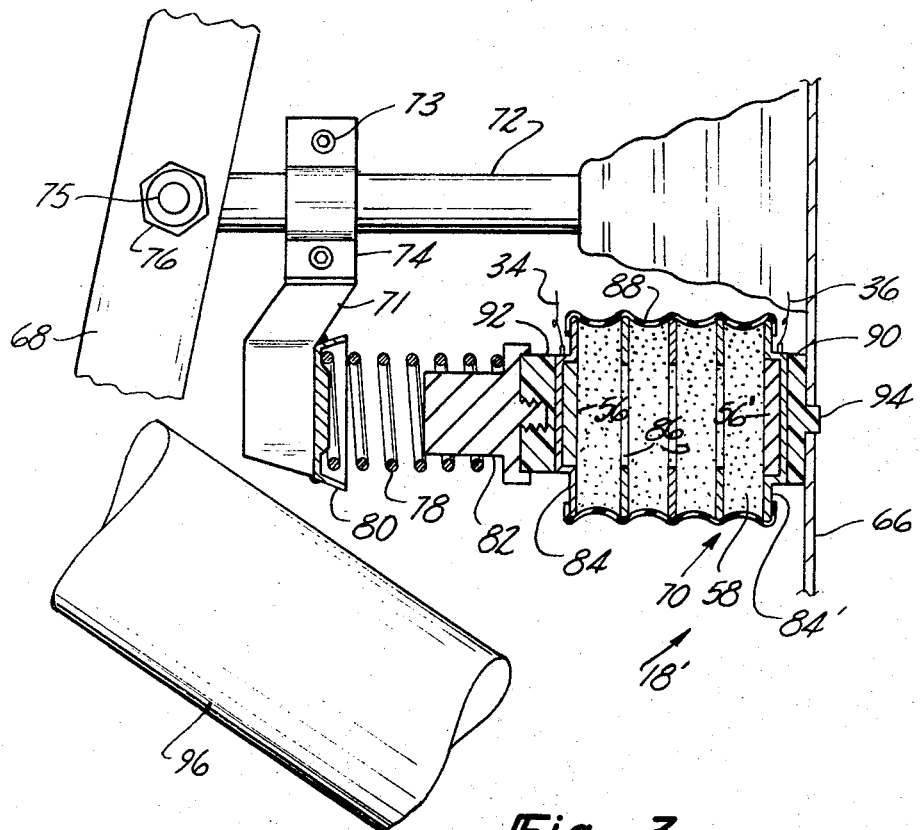
FIG. 3 is a sectional view of a modified form of the transducer device mechanically actuated by a brake pedal of a towing vehicle.

FIG. 3 illustrates a modified form of a transducer device 18', also in accordance with the present invention, which is mounted on a fire wall 66 of a towing vehicle and mechanically connected with a swing arm 68 of a brake pedal of the towing vehicle. A bellows assembly 70 of transducer device 18' is connected to arm 68 through the arm 71 of a bracket 74 fixed by screws 73 to an actuating rod 72 of a hydraulic master cylinder (not shown, but which may be the same as master cylinder 12 with brakelight switch 32) of the brake system of the towing vehicle. Rod 72 is connected to arm 68 by a pivot pin 75 retained on the arm by a nut 76. Bellows assembly 70 is yieldably connected to arm 71 by a spring 78 having one end thereof received in a cup 80 fixed to the arm and the other end received over the shank of a retainer 82. Bellows assembly 70 is generally similar to bellows assembly 44 and has a pair of circular opposed electrically conductive end caps 84, 84' and a plurality of washers 86, both of a paramagnetic material such as aluminum, received in a tubular cover 88 made of a flexible resilient rubber material and bonded thereto by a suitable epoxy adhesive material. A pair of ceramic disc magnets 56 and 56' are received one in each end cap 84, 84' and the end caps are adhered to nylon electrical insulators 90 and 92 by a suitable adhesive. Insulator 90 has a projection 94 thereon received in a hole in fire wall 66 and insulator 92 is threadably connected to a stud of spring retainer 82. Leads 34 and 36 are each electrically connected to one of the end caps 84. Bellows assembly 70 thus is located in a protected area between brake pedal arm 68, fire wall 66 and the steering column 96 of the towing vehicle.

In operation, when the towing vehicle brakes are applied by depressing the brake foot pedal, bellows assembly 44 or 70 of transducer device 18 or 18' is partially collapsed or foreshortened. With respect to the first form of transducer 18, bellows 44 is foreshortened by the extension of plunger 62 of hydraulic cylinder 46 in proportion to the fluid pressure created by master cylinder 12 as it is actuated by foot pedal 10. With respect to the modified transducer 18', bellows assembly 70 is foreshortened due to arm 68 pivoting clockwise and thus moving rod 72 and arm 71 toward the fire wall 66, this action occurring in proportion to the displacement of arm 68 which in turn is displaced in proportion to the force applied thereto by the operator. Hence, in both transducer devices 18 and 18', the bellows assembly 44 or 70 is foreshortened in proportion to the braking force applied to the hydraulic brake system of the towing vehicle by the operator thereof.

Initial actuation of the master cylinder 12 closes brakelight switch 32 to supply current from battery 22 to transducer 18 or 18' through leads 34 and 30. The aluminum end caps 48 or 84 each provide one terminal of the transducer device through which current flows from battery 22 in proportion to the resistance offered by the magnetic powdered material 58 received in the bellows assembly. The electrical resistance of powdered magnetic material 58 varies generally in direct proportion to the compression force applied axially to the bellows assembly. Hence, with the battery voltage being essentially constant, as the powdered mixture is compressed, its electrical resistance decreases and thus causes an increase in the current flow from battery 22 through the transducer device 18 or 18' to the electrical brake coils 26 and 28 of the towed vehicle, resulting in the application of a braking force on the towed vehicle proportional to the braking force developed in the towing vehicle. When bellows assemblies 44 and 70 are completely relaxed or extended, transducer devices 18 and 18' have a very high electrical resistance such that practically no current flows through the transducers. Moreover, when the bellows assemblies are completely extended, switch 30 is open and thus the towed vehicle brake coils 26 and 28 are not energized.

In the absence of magnets 56, repeated foreshortening of bellows assemblies 44 and 70 would tend to permanently compact and adhere the particles of magnetic material 58 to each other so that transducer 18 or 18' would not provide a variable electrical resistance in proportion to the force applied thereto. However, in accordance with one principal feature of the invention, the magnetic lines of force provided by, and extending axially of the bellows chamber between the pair of disc magnets 56 and 56' tend to draw the powdered particles of magnetic material toward the magnets to thereby loosen or break up any compacting or adhesion of the particles resulting from foreshortening of the bellows assemblies. Thus, due to the magnets, the powdered particles recover when the bellows assemblies are extended to their relaxed or normal length after each pressure application so that they can again achieve on a repetitive basis their original design value of high electrical resistance provided by the loose, less compacted form of particle distribution in the bellows chamber. The bellows are expanded to their normal relaxed length whenever the brakes of the towing vehicle are not actuated, either due to the resiliency of rings 52 in assembly 18 or due to the combined action of resilient cover 88 and spring 78 in assembly 18'. If desired, permanent magnets 56, 56' can be replaced with or augmented by a coil of electrically conductive material such as wire wound around the exterior of the bellows assemblies and electrically connected to the brake control circuit to provide an electromagnet having a field when energized extending axially of the bellows chamber.

From the foregoing description, it will now be evident that the rugged construction of the transducer devices 18 and 18' of this invention and the use of a magnetic field to prevent the compacting of the powdered material by repeated cycling of the bellows assembly provides a maintenance and service free transducer control system and device with a long useful life. The bellows construction with resilient rings 52 interleaved between and bonded to washers 50 and end caps 48 provides a resilient bellows assembly which does not appreciably expand radially as it is foreshortened axially to compress the magnetic powdered material 58 and hence provides a rugged and durable bellows of economical manufacture and assembly which most effectively and efficiently compresses the powdered magnetic material.

It will also be understood that, with respect to the first form of bellows 18, the radial thickness of the resilient rings 52 may be varied to provide proper resiliency and compressibility characteristics for a given application, taking into account the number and spacing of discs 50. Moreover, the distance by which the inner edges 53 of disc 52 protrude radially inwardly from the inner periphery of the associated rings 52 is a significant factor in determining the force required to compress the powder 58 as well as the cooling effect provided by washers 50. The farther the washers protrude into the powder, the more powder which will be trapped between the washers and thus the greater will be the resistance offered to compression of the bellows. Thus, if a low "squeeze" force is desired, the inner peripheries of rings 52 should be arranged closer to the inner edges 53 of the washers, and in some applications may even be made flush with the inner edges 53, and vice versa for a high squeeze force. On the other hand, the farther the washers protrude into the powder, the better will be the heat transfer characteristics provided by the washers for conducting heat from the powder mass radially outwardly to the exterior of the bellows for dissipation by the radially outwardly protruding portions or "fins" of the washers.

It is to be further understood that either of the transducer devices 18 or 18' can be coupled to a manual control through a suitable force multiplying mechanical linkage employing, for example, a Bowden wire extension to a dashboard mounted handle (somewhat similar to that shown in U.S. Pat. No. 3,497,266). In this way, compression force may be manually applied to the bellows assembly 44 or 70 to thereby provide the towing vehicle operator with a separate hand controlled means of applying the trailer brakes using the same control transducer 18 or 18'. If the force applicator of the manual linkage is arranged similar to plunger 62 so as to have abutment contact with cap 60', and is suitably spring retracted when hand pressure is relieved from the manual control, the application of the towing vehicle brakes via the foot pedal 10 will override the manual control and cause conjoint operation of the towing vehicle and trailer brakes.

Although the transducers 18 or 18' of the present invention have particularly desirable features in a trailer brake control system of the present invention, the transducers themselves also are advantageous in other applications in which a variable resistance circuit element is desired which is responsive to pressure to vary the resistance of the element, and in which large forces are encountered on a repetitive basis and a uniform recovery characteristic is desired over a prolonged cycle of life.

By way of illustration, and not by way of limitation, one successful working embodiment of a transducer 18 constructed in accordance with the present invention employed the following structural specifications:

| | |
|---|---|
| Axial dimension from magnet 56 to magnet 56' in the fully relaxed state | 1⅛" (FIG. 2) |
| | 1¾" (FIG. 3) |
| Axial dimension from magnet 56 to magnet 56' in the fully compressed state | 1.222" (FIG. 2) |
| | 1 11/16" (FIG. 3) |
| Inside diameter of washers 52 | 1½" |
| Outside diameter of washers 52 | 2" |

— Continued

| | |
|---|---|
| Axial distance between washers 52 in relaxed state | ¼" |
| Axial thickness of washers 52 | 1/32" |
| Radial thickness of rings 52 | ½" |
| Weight of charge of powder 58 contained in bellows chamber | 36.322 grams |
| Type, diameter and axial thickness of ceramic disc magnets 56 and 56' | Ceramic ¾" Dia. ×⅛" |
| Range of force applied by plunger 62 (⅜ dia. rod) | 5 lbs. to max. brake pressure |
| Range of resistance values provided by transducer 18 | 1 ohm to 1 megohm |
| Range of values of current flow through transducer 18 | 0.000012 amps min. 6 amps max. with 2 pucks load |

Average particle size and composition of powder 58

Typical physical properties:

| | |
|---|---|
| Apparent density | 2.85 grams/cc |
| Flow rate | 26 seconds |

Typical screen analysis:

| | |
|---|---|
| On 60 U.S. Mesh | 0% |
| −60 +100 Mesh | 2.0% |
| −100 +140 Mesh | 22.0% |
| −140 +200 Mesh | 25.0% |
| −200 +325 Mesh | 28.0% |
| −325 Mesh | 23.0% |

Typical chemical analysis:

| | |
|---|---|
| Iron content | 99+% |
| Hydrogen loss | 0.18% |
| Carbon | 0.03% |
| Sulphur | 0.015% |
| Manganese | 0.009% |
| Phosphorous | 0.025% |
| Silicon | 0.09% |
| Acid insolubles | 0.17% |

I claim:

1. A pressure responsive variable electrical resistance electric brake control device comprising, a flexible bellows having a chamber therein and capable of being contracted and expanded in a given direction in response to forces applied oppositely thereto generally in said given direction, a pair of electrically conductive contacts associated with said bellows disposed in spaced relation along said given direction, a powdered magnetic material received in said bellows chamber between and in engagement with both of said electrically conductive contacts, means providing a magnetic field having lines of magnetic force extending within said bellows chamber generally in said given direction, and force application means adapted to foreshorten said flexible bellows and thereby apply pressure to said powdered material in proportion to the force applied by an operator in actuating the brake system of a towing vehicle, whereby contraction of said bellows in response to said applied forces compresses said powdered magnetic material received in said bellows and thereby decreases the electrical resistance between said conductive contacts in proportion to the value of the applied forces.

2. The control device of claim 1 wherein said bellows is generally tubular with the axis thereof extending in said given direction, and wherein said force application means comprises a hydraulic cylinder mounted in relation to said bellows to apply a generally axial force thereto to foreshorten said bellows, said hydraulic cylinder being adapted for fluid coupling with a master cylinder of a hydraulic brake system of a towing vehicle.

3. The control device of claim 1 in which said force application means comprises a brake pedal of a towing vehicle and resilient means yieldably connecting said bellows with said pedal for shortening said bellows in proportion to the displacement of the brake pedal of the towing vehicle during actuation thereof by the operation of the towing vehicle in applying the towing vehicle brakes.

4. The control device of claim 1 wherein said electrically conductive contacts comprise a pair of generally opposed axially aligned end caps connected to opposed ends of said flexible bellows, said end caps being made of an electrically conductive paramagnetic material.

5. The control device of claim 1 wherein said bellows comprises a generally tubular enclosure defining a chamber therein receiving said powdered material therein and a plurality of washers of a paramagnetic material generally axially spaced from one another and each at least partially received in said chamber.

6. The control device of claim 5 including a plurality of rings of a flexible resilient electrical insulating material interleaved with said washers and individually bonded to opposed faces of adjacent washers with said washers extending generally radially outwardly beyond said rings of flexible resilient material.

7. The control device of claim 6 wherein said flexible resilient material of said rings is a silicone rubber.

8. The control device of claim 6 wherein said conductive contacts comprise a pair of axially spaced generally opposed end caps each bonded to one of said rings of resilient flexible material with all of said washers interposed between said end caps.

9. The control device of claim 5 wherein said tubular enclosure comprises a resilient flexible sleeve secured to the outer peripheries of said washers.

10. The control device of claim 1 wherein said means providing a magnetic field comprises a pair of permanent magnets spaced apart in said chamber and mounted with their polar axes extending in said given direction.

11. The control device of claim 10 wherein said permanent magnets comprise axially polarized circular discs mounted in generally axially opposed relation adjacent opposite ends of said bellows chamber.

12. The control device of claim 11 wherein said magnets comprise ceramic disc magnets mounted in coaxially opposed relation adjacent opposite ends of said flexible bellows.

13. The control device of claim 12 wherein said disc permanent magnets are mounted one on each of said end caps in generally axially opposed relation with the one pole of one of said magnets facing the opposite pole of the other of said magnets.

* * * * *